(12) United States Patent
Kuramoto

(10) Patent No.: US 9,059,608 B2
(45) Date of Patent: Jun. 16, 2015

(54) ROTATION ASSISTANCE DEVICE, ROTATION ASSISTANCE METHOD, AND POWER GENERATION DEVICE

(75) Inventor: Shigeyoshi Kuramoto, Kanagawa (JP)

(73) Assignee: NAPONE CO., LTD., Kawasaki-shi (JP)

( * ) Notice: Subject to any disclaimer, the term of this patent is extended or adjusted under 35 U.S.C. 154(b) by 0 days.

(21) Appl. No.: 14/233,272

(22) PCT Filed: Aug. 10, 2012

(86) PCT No.: PCT/JP2012/005093
§ 371 (c)(1),
(2), (4) Date: Jan. 16, 2014

(87) PCT Pub. No.: WO2013/031106
PCT Pub. Date: Mar. 7, 2013

(65) Prior Publication Data
US 2014/0319845 A1   Oct. 30, 2014

(30) Foreign Application Priority Data
Sep. 2, 2011   (JP) .................................. 2011-206606

(51) Int. Cl.
*F02B 63/04* (2006.01)
*F03G 7/08* (2006.01)
*H02K 7/18* (2006.01)
(Continued)

(52) U.S. Cl.
CPC .. *H02K 7/02* (2013.01); *F03G 3/08* (2013.01); *H02K 7/1807* (2013.01)

(58) Field of Classification Search
USPC .............. 290/1 R; 310/74; 384/215
See application file for complete search history.

(56) References Cited

U.S. PATENT DOCUMENTS 4,089,566 A * 5/1978 Schmidt .................... 384/215
4,613,782 A * 9/1986 Mori et al. ............... 310/323.16
(Continued)

FOREIGN PATENT DOCUMENTS

JP    50-126832    10/1975
JP    51-119441    10/1976
(Continued)

OTHER PUBLICATIONS

International Search Report issued Nov. 6, 2012, in PCT/JP12/005093 filed Aug. 10, 2012.
(Continued)

*Primary Examiner* — Pedro J Cuevas
(74) *Attorney, Agent, or Firm* — Oblon, McClelland, Maier & Neustadt, L.L.P.

(57) ABSTRACT

A rotation assistance device (1) is equipped with a rotating shaft body (11) and multiple rotation assistance bodies (20), which are equipped with rotating bodies (40). The rotating bodies are equipped with a rotation-promoting body (22), having a mass that maintains rotation, and with a spring shaft (23), one end of which is connected to the shaft body (11) and the other end of which is connected to the rotation-promoting body (22), and which expands and contracts in the lengthwise direction by means of an elastic body. The rotation assistance bodies also are equipped with guide rails (21), which guide the rotation-promoting bodies (22) of the rotating bodies (40) so as to rotate in an elliptical orbit. The rotating bodies (40) are attached to the shaft body (11) such that their respective attachment angles around the axis of rotation are displaced with respect to each other.

5 Claims, 5 Drawing Sheets

(51) Int. Cl.
*F03G 3/08* (2006.01)
*H02K 7/02* (2006.01)

(56) References Cited

U.S. PATENT DOCUMENTS

| | | | | |
|---|---|---|---|---|
| 5,191,688 | A * | 3/1993 | Takizawa et al. | 29/25.35 |
| 6,209,495 | B1 * | 4/2001 | Warren | 123/55.2 |
| 6,885,615 | B1 * | 4/2005 | Miyazawa et al. | 368/255 |
| 7,078,847 | B2 * | 7/2006 | Miyazawa et al. | 310/323.02 |
| 7,253,552 | B2 * | 8/2007 | Miyazawa et al. | 310/323.02 |
| 7,355,802 | B2 * | 4/2008 | Homme | 359/824 |
| 7,923,899 | B2 * | 4/2011 | Adachi | 310/323.14 |
| 8,063,525 | B2 * | 11/2011 | Petereit et al. | 310/90 |
| 8,297,149 | B2 * | 10/2012 | Tochimoto et al. | 74/570.3 |
| 2004/0240759 | A1 * | 12/2004 | Swann et al. | 384/309 |
| 2005/0039556 | A1 * | 2/2005 | Nowlan | 74/84 S |
| 2006/0226737 | A1 * | 10/2006 | Miyazawa et al. | 310/323.02 |
| 2007/0120430 | A1 | 5/2007 | Kurosawa | 310/74 |
| 2008/0207390 | A1 * | 8/2008 | Tochimoto et al. | 476/67 |
| 2009/0091203 | A1 * | 4/2009 | Petereit et al. | 310/90 |
| 2009/0248360 | A1 * | 10/2009 | Garrison | 702/182 |

FOREIGN PATENT DOCUMENTS

| | | |
|---|---|---|
| JP | 61-187579 | 8/1986 |
| JP | 1-170767 | 7/1989 |
| JP | 6-183387 | 7/1994 |
| JP | 2007-151364 | 6/2007 |

OTHER PUBLICATIONS

International Preliminary Report on Patentability issued Mar. 13, 2014 in PCT/JP2012/005093 filed Aug. 10, 2012 (English translation only).

Written Opinion issued Nov. 6, 2012 in PCT/JP2012/005093 filed Aug. 10, 2012 (English translation only).

* cited by examiner

ROTATION ASSISTANCE DEVICE, ROTATION ASSISTANCE METHOD, AND POWER GENERATION DEVICE

TECHNICAL FIELD

Embodiments of the present invention relate to a rotation assistance device, a rotation assistance method, and a power generation device.

BACKGROUND ART

For devices that are driven by rotation energy, such as automobiles, ships, and power generation devices, a flywheel is used to allow and maintain smooth rotation.

A typical flywheel employs a metal that is formed into a disk shape. Accordingly, the weight of the flywheel itself is heavy. The heavy weight leads to a decrease in fuel efficiencies of automobiles and ships.

In that respect, what is proposed is a technique for arranging a magnet on an outer periphery of the flywheel in such a way that the magnet is inclined, and fixing the magnet to an outer side of the flywheel to make use of a repulsive force of the magnet to reduce attenuation of the rotation energy.

However, according to the above technique, the flywheel becomes inevitably large and heavy.

CITATION LIST

Patent Literature

PLT 1: Japanese Patent Application Laid-Open No. 2007-151364

SUMMARY OF THE INVENTION

Technical Problem

Therefore, a small, lightweight rotation assistance device is desired.

Solution to Problem

To solve the above problem, an embodiment of the present invention provides a rotation assistance device including a plurality of rotation assistance bodies each of which includes: a shaft body that rotates; a rotation body that includes a rotation promotion body which has mass to keep rotation, and a spring shaft whose one end is connected to the shaft body and the other end to the rotation promotion body and which expands and contracts in a radial direction with the help of an elastic body; and a guide rail that regulates in such a way that the rotation promotion body of the rotation body is shifted in an elliptical manner, wherein the rotation bodies are mounted to the shaft body in such a way that mounting angles around a rotation axis are different from one another.

DESCRIPTION OF EMBODIMENTS

Hereinafter, an embodiment of a rotation assistance device, rotation assistance method, and power generation device will be described in detail with the use of the accompanying drawings.

A rotation assistance device of the present embodiment includes a plurality of rotation assistance bodies, each of which includes: a shaft body that rotates; a rotation body that includes a rotation promotion body which has mass to keep rotation, and a spring shaft whose one end is connected to the shaft body and the other end to the rotation promotion body and which expands and contracts in a radial direction with the help of an elastic body; and a guide rail that regulates in such a way that the rotation promotion body of the rotation body changes in an elliptical manner, wherein the rotation bodies are mounted to the shaft body in such a way that mounting angles around a rotation axis are different from one another.

Figure 1:
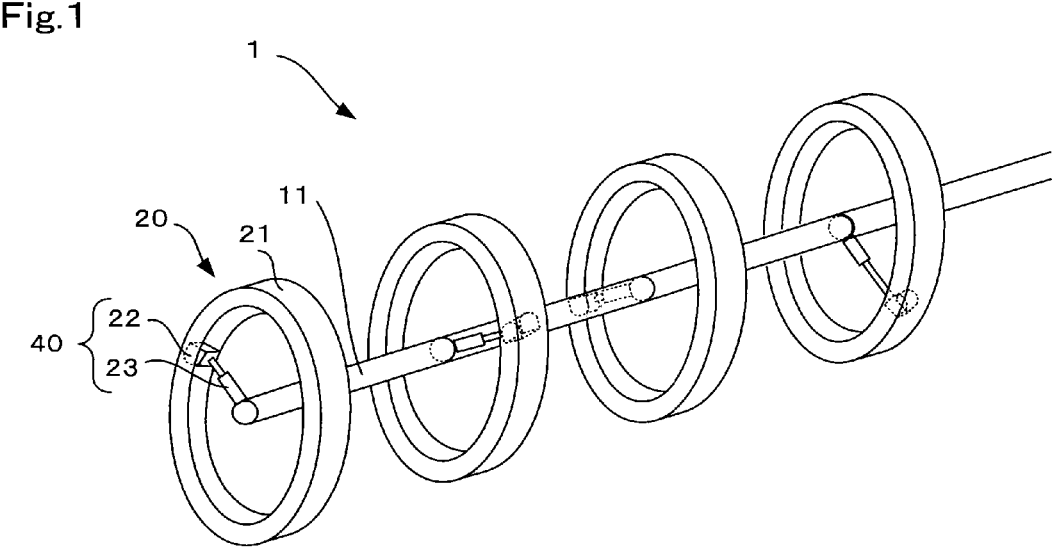
FIG. 1 is a diagram showing the configuration of a rotation assistance device.

FIG. 1 is a diagram showing the configuration of a rotation assistance device 1 of the present embodiment. As shown in FIG. 1, the rotation assistance device 1 includes a plurality of rotation assistance bodies 20, each of which includes: a shaft body 11 that rotates; a rotation body 40 that includes a rotation promotion body 22 which has mass to keep rotation, and a spring shaft 23 whose one end is connected to the shaft body 11 and the other end to the rotation promotion body 22 and which expands and contracts in a radial direction of a rotation circle, or in a longitudinal direction, with the help of an elastic body 33 described later; and a guide rail 21 that regulates in such a way that a rotation orbit of the rotation promotion body 22 of the rotation body 40 is elliptical, wherein the rotation bodies 40 are mounted to the shaft body 11 in such away that mounting angles around a rotation axis are different from one another.

The rotation promotion body 22 is a weight that has enough mass to keep a rotation force.

A portion of the guide rail 21 that regulates rotation of the rotation promotion body 22 is formed into an elliptical shape; a plurality of guide rails 21 are so disposed that long-axis directions of the ellipses are aligned with one another.

Incidentally, the guide rails 21 are not limited to rails. The guide rails 21 may be mounted in such a way that the long-axis directions of the ellipses are different from each other.

The spring shaft 23 includes an elastic body 33 that presses the rotation promotion body 22 in an outer peripheral direction.

In this case, the spring shaft 23 is a support member that expands and contracts in a longitudinal direction with the help of the elastic body 33. The elastic body 33 is not limited to the spring; any other member having an elastic force may be used. The elastic body 33 may be an air cylinder, a fluid cushion, or a resin having an elastic force.

Figure 2:
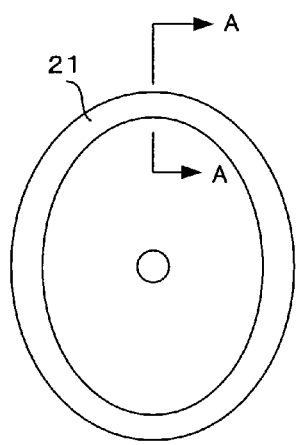
FIG. 2 is a front view of a guide rail.
Figure 3:
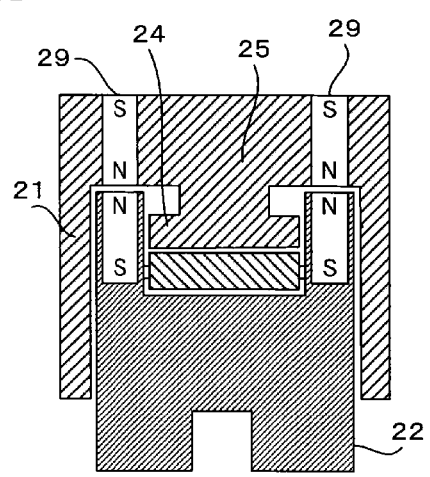
FIG. 3 is a cross-sectional view of the guide rail of FIG. 2 taken along line AA.

FIG. 2 is a front view of the guide rail 21. FIG. 3 is a cross-sectional view of the guide rail 21 of FIG. 2 taken along line AA.

As shown in FIGS. 2 and 3, the guide rail 21 is formed into an elliptical shape, and a cross section thereof is in a U-shape. Inside the guide rail 21, a rail 24 is provided. The rail 24 may have permanent magnets 29 having an S-pole magnetized outer side and an N-pole magnetized inner side. The permanent magnets 29 may be electromagnets.

The spring shaft 23 may be curved in a rotation direction of the spring shaft 23, or in a direction opposite to the rotation direction.

Figure 4:
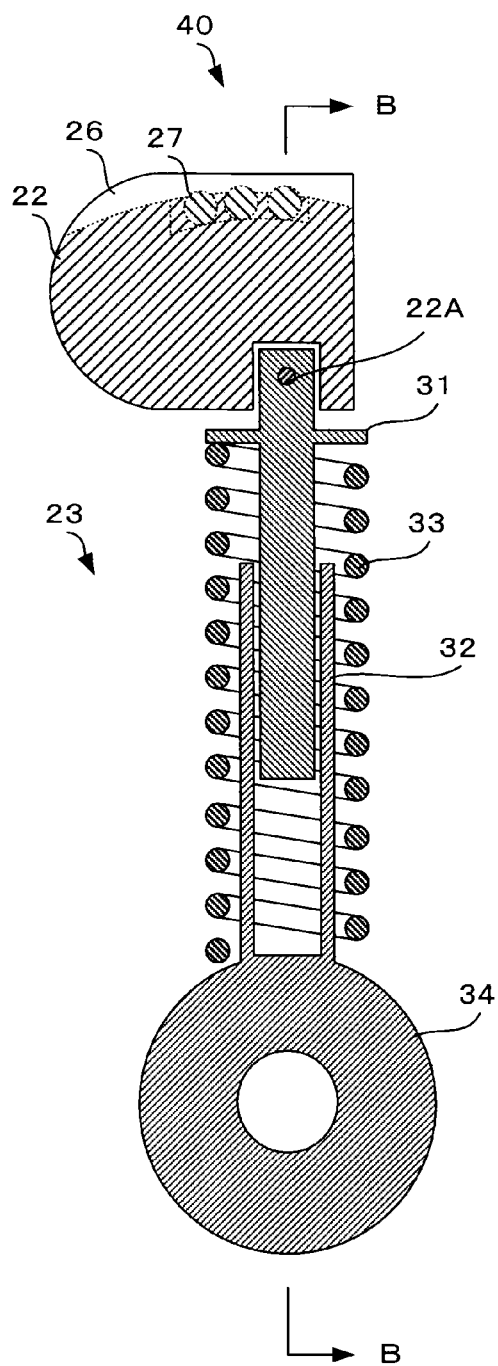
FIG. 4 is a side cross-sectional view of a first example of a rotation body.
Figure 5:
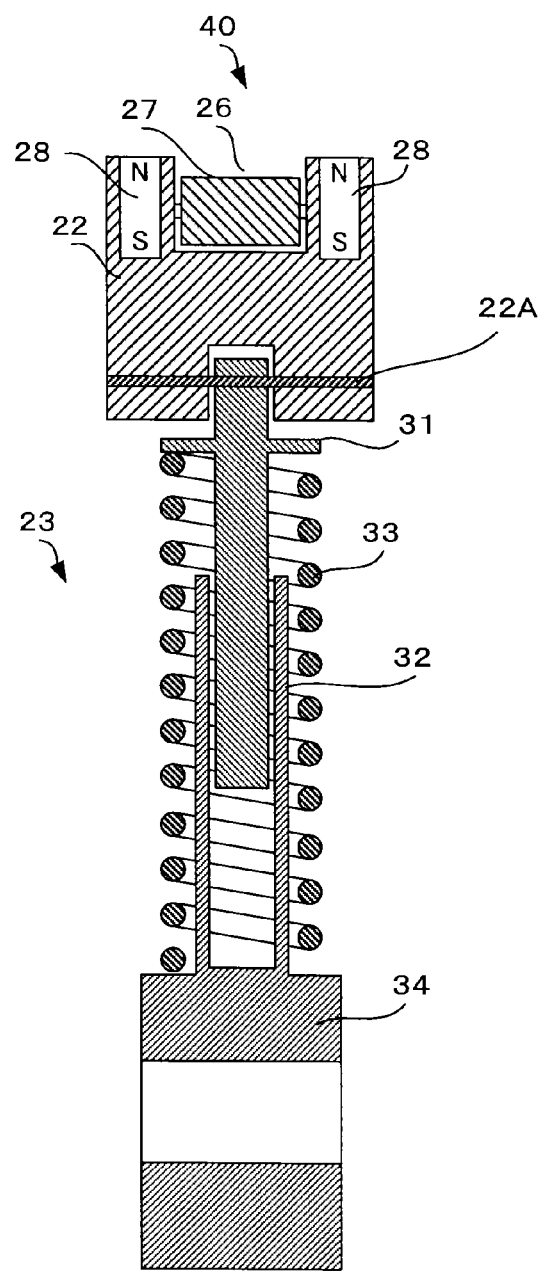
FIG. 5 is a cross-sectional view of the first example of the rotation body of FIG. 4 taken along line BB.

FIG. 4 is a side cross-sectional view of a first example of the rotation body 40. FIG. 5 is a cross-sectional view of the first example of the rotation body 40 of FIG. 4 taken along line BB.

As shown in FIGS. 4 and 5, the rotation body 40 includes the rotation promotion body 22, the spring shaft 23, and the elastic body 33.

The rotation promotion body 22 includes a curved section that faces a rotation direction, and includes a groove section 26, into which a rail 24 is fitted, and rollers 27, which come in contact with the rail 24.

If the rail 24 includes the permanent magnets, the rotation promotion body 22 further includes permanent magnets 28 that are N-pole magnetized toward a rotation-direction outer periphery and are S-pole magnetized toward an inner peripheral direction.

A repulsive force of the permanent magnets reduces friction between the rotation promotion body 22 and the rail 24.

The spring shaft 23 includes an inner core 31, whose one end is joined to the rotation promotion body 22; an external cylinder 32, whose one end is joined to the shaft body 11 and into which the inner core 31 is inserted; a connection section 34, which connects the external cylinder 32 to the shaft body 11; and the elastic body 33. That is, the spring shaft 23 is so formed as to have a cylinder structure, and the elastic body 33 is provided on an outer periphery of the cylinder. It is desirable that an expansion-contraction direction of the spring shaft 23 be the same as an expansion-contraction direction of the elastic body 33.

The rotation promotion body 22 is mounted to the inner core 31 through a pin 22A in such a way as to be able to rotate in the rotation direction of the rotation body 40. Accordingly, the rotation promotion body 22 has play so as to rotate in the rotation direction of the rotation body 40.

The rotation promotion body 22 is mounted in such a way that the center of gravity thereof is shifted from the pin 22A in the rotation direction of the rotation body 40 or in a direction opposite to the rotation direction.

The elastic body 33 should be a helical spring, which is advantageous in terms of manufacturing costs. The elastic body 33 maybe an air cylinder or a synthetic resin having an elastic force.

If the elastic body 33 is a helical spring, the elastic body 33 is so placed as to go around the outer sides of the inner core 31 and external cylinder 32.

The elastic body 33 pushes the inner core 31 toward the rotation promotion body 22.

Figure 6:
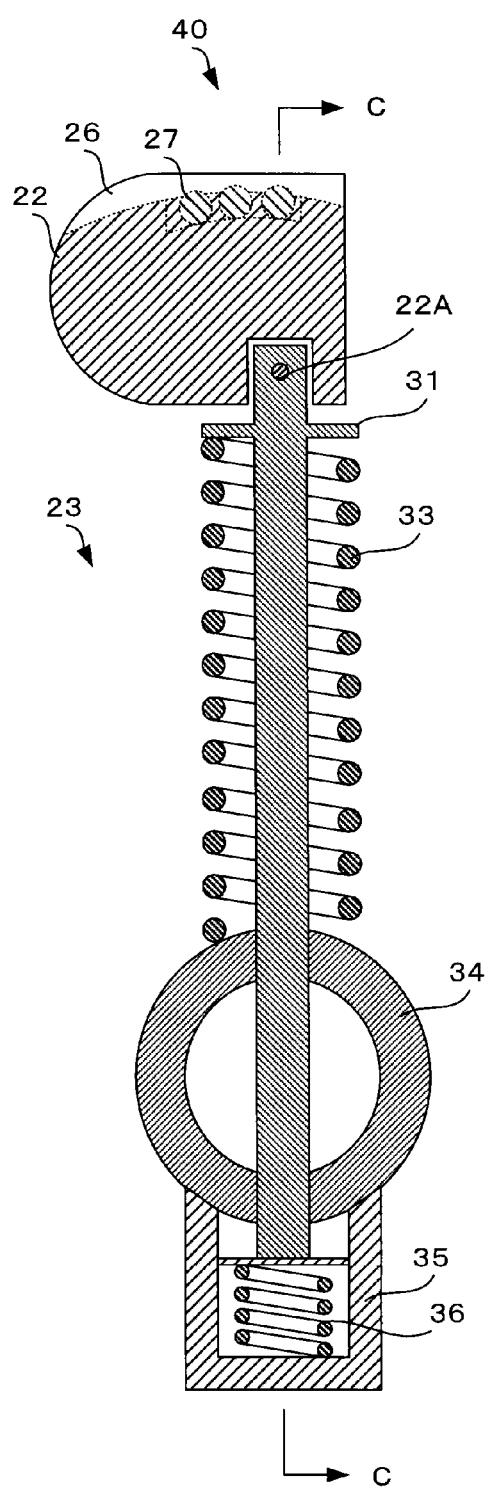
FIG. 6 is a side cross-sectional view of a second example of a rotation body.
Figure 7:
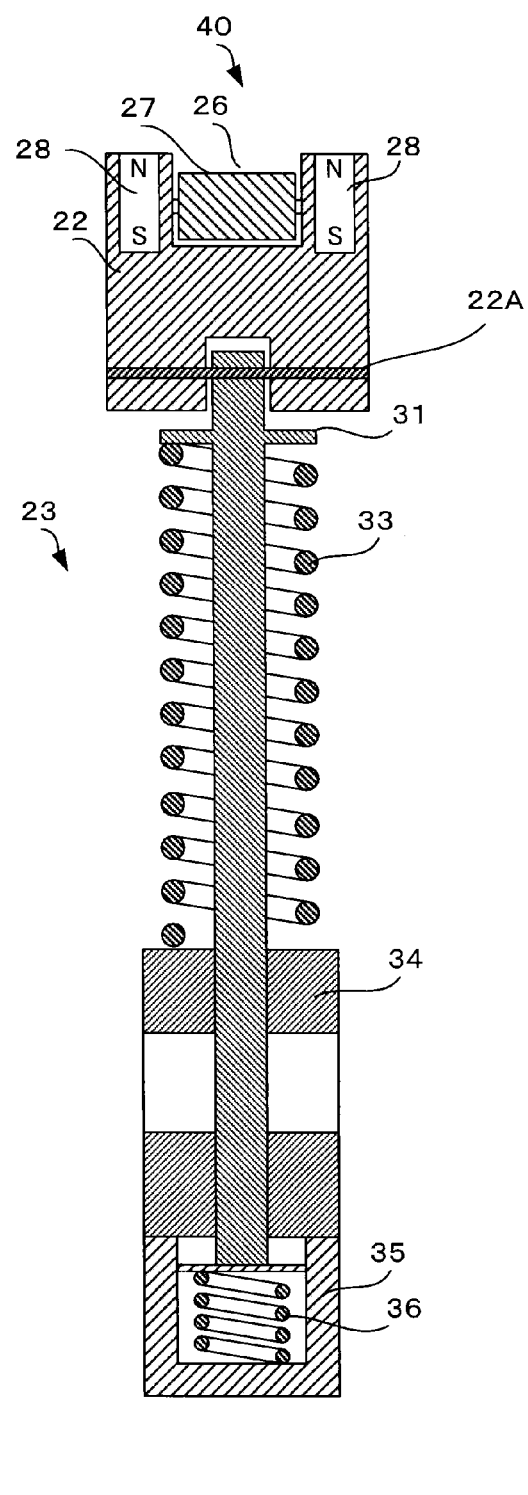
FIG. 7 is a cross-sectional view of the second example of the rotation body of FIG. 6 taken along line CC.

FIG. 6 is a side cross-sectional view of a second example of the rotation body 40. FIG. 7 is a cross-sectional view of the second example of the rotation body 40 of FIG. 6 taken along line CC.

As shown in FIGS. 6 and 7, the rotation body 40 can be formed in such a way that an inner core 31 passes through a connection section 34 and a shaft body 11.

In this case, the rotation body 40 may include a spring chamber 35, which is provided at an end portion of the inner core 31 that protrudes from the connection section 34 and which houses the end portion; and an elastic member 36, which pushes the end portion toward the rotation promotion body 22.

The elastic member 36 helps an elastic body 33 expand and contract, and also helps to keep the rotation of the rotation body 40 for a longer time.

Incidentally, on the rotation body 40 of the second example, the external cylinder 32 may not be provided.

The configuration of the other portions of the rotation body 40 of the second example is the same as that of the rotation body of the first example.

Figure 8:
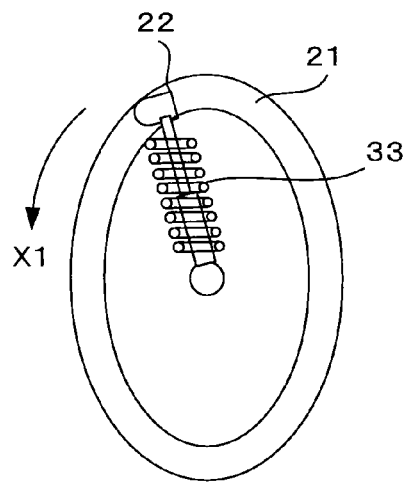
FIG. 8 is a diagram showing how a rotation body is rotated.

FIGS. 8 to 11 are diagrams showing how the rotation body 40 is rotated. As shown in FIG. 8, when the rotation body 40 is shifted in a direction of arrow X1 from an ellipse long axis position to a short axis position, the orbit of the rotation promotion body 22 is regulated by the guide rail 21; the spring shaft 23 is shortened, and the elastic body 33 is compressed toward the shaft body 11. That is, the rotation energy is accumulated in the elastic body 33.

Figure 9:
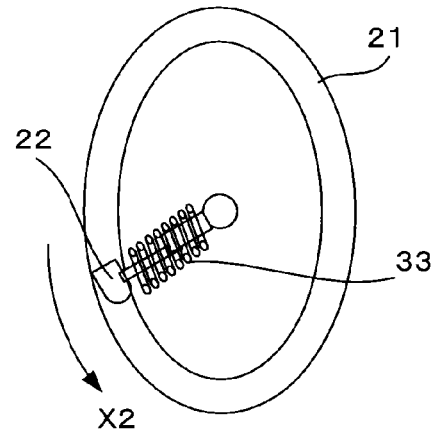
FIG. 9 is a diagram showing how a rotation body is rotated.

As shown in FIG. 9, when the rotation body 40 is shifted in a direction of arrow X2 from an ellipse short axis position to a long axis position, the compressed elastic body 33 expands. At this time, the energy accumulated in the elastic body 33 is released in a direction in which the rotation promotion body 22 is rotated.

Figure 10:
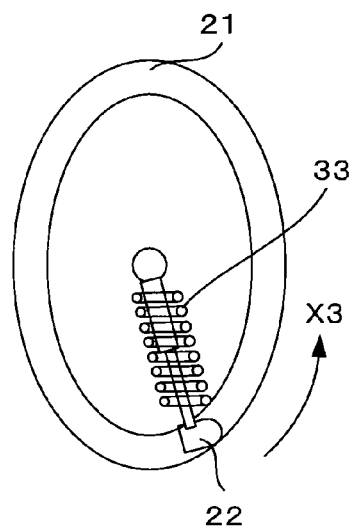
FIG. 10 is a diagram showing how a rotation body is rotated.

As shown in FIG. 10, when the rotation body 40 is shifted in a direction of arrow X3 from an ellipse long axis position to a short axis position, the rotation energy is accumulated in the elastic body 33 as in the case of FIG. 6.

Figure 11:
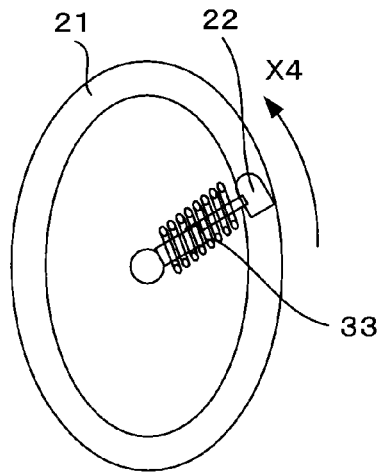
FIG. 11 is a diagram showing how a rotation body is rotated.

As shown in FIG. 11, when the rotation body 40 is shifted in a direction of arrow X4 from an ellipse short axis position to a long axis position, the compressed elastic body 33 expands. At this time, the energy accumulated in the elastic body 33 is released in a direction in which the rotation promotion body 22 is rotated.

In this case, because of the loss of energy caused by friction or the like, the energy is not sufficient enough for the rotation body 40 to completely make one rotation.

However, mounting positions of the other rotation bodies 40 on the shaft body 11 are different; the rotation body 40 therefore makes one rotation by using the energy accumulated in the elastic bodies 33 of the other rotation bodies 40.

As described above, an interchange of energy takes place between a plurality of rotation bodies 40, so that the rotation bodies 40 continue to rotate.

Accordingly, compared with a disc-shaped flywheel, it is possible to reduce the mass even when maintaining the same rotation force.

According to an experiment, compared with a disc-shaped flywheel of the same mass, the rotation assistance device 1 could continue to rotate 30% longer.

Figure 12:
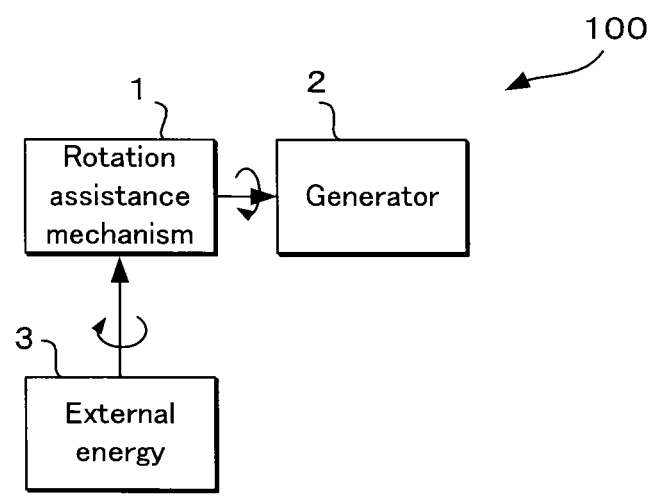
FIG. 12 is a diagram showing an example of a power generation device that uses a rotation assistance device.

FIG. 12 is a diagram showing an example of a power generation device 100 that uses the rotation assistance device 1. As shown in FIG. 12, the power generation device 100 includes the rotation assistance device 1 and a generator 2. External energy 3 uses an appropriate device to give a rotation force to the rotation assistance device 1.

The external energy 3 is produced by converting the energy generated by thermal power generation, hydraulic power generation, nuclear power generation, solar cells, internal-combustion engines, or the like into rotation energy.

In the case of the power generation device 100, the advantage is that, without an increase in the mass of the generator, it is possible to generate power in a stable manner even when a load is varied.

The above has described several embodiments. However, the embodiments are given for illustrative purposes, and not intended to limit the scope of the invention. The embodiments may be embodied in other various forms. Various omissions, replacements and changes may be made without departing from the subject-matter of the invention. The above embodiments and variants thereof are within the scope and subject-matter of the invention, and are similarly within the scope of the invention defined in the appended claims and the range of equivalency thereof.

REFERENCE SIGNS LIST

11: Shaft body
21: Guide rail
22: Rotation promotion body
23: Spring shaft
33: Elastic body

The invention claimed is:

1. A rotation assistance device, comprising
a plurality of rotation assistance bodies each of which includes:
    a shaft body that rotates;
    a rotation body that includes a rotation promotion body which has mass to keep rotation, and a spring shaft whose one end is connected to the shaft body and the other end to the rotation promotion body and which expands and contracts in a longitudinal direction with the help of an elastic body; and
    a guide rail that guides the rotation promotion body of the rotation body in such a way that the rotation promotion body is rotated in an elliptical orbit, wherein
    the rotation bodies are mounted to the shaft body in such a way that mounting angles around a rotation axis are different from one another.

2. The rotation assistance device according to claim 1, wherein:
    the rotation promotion body includes a permanent magnet that is magnetized in a radial direction; and
    the guide rail includes a permanent magnet or electromagnet that is provided at an inner side and is magnetized in an outer peripheral direction.

3. The rotation assistance device according to claim 2, wherein
    a center of gravity of the rotation promotion body is shifted so as to be closer to a rotation-direction side of the rotation body or an opposite rotation direction side thereof than a mounting position of the rotation promotion body on the shaft.

4. A rotation assistance method, comprising:
mounting, on a shaft body that rotates, a plurality of rotation bodies that each include a rotation promotion body which has mass to keep rotation, and a spring shaft whose one end is connected to the shaft body and the other end to the rotation promotion body and which expands and contracts in a longitudinal direction with the help of an elastic body, in such a way that mounting angles on the shaft body around a rotation axis are different from one another;
guiding the rotation promotion body by using a guide rail in such a way that the rotation promotion body is rotated in an elliptical orbit; and
assisting rotation by rotating the rotation bodies.

5. A power generation device, comprising:
a rotation assistance device including a plurality of rotation assistance bodies each of which includes
    a shaft body that rotates,
    a rotation body that includes a rotation promotion body which has mass to keep rotation, and a spring shaft whose one end is connected to the shaft body and the other end to the rotation promotion body and which expands and contracts in a longitudinal direction with the help of an elastic body, and
    a guide rail that guides the rotation promotion body of the rotation body in such a way that the rotation promotion body is rotated in an elliptical orbit, wherein
    the rotation bodies are mounted to the shaft body in such a way that mounting angles around a rotation axis are different from one another;
a connection device that connects external energy to the shaft body; and
a generator that is connected to the shaft body.

* * * * *